United States Patent
Barnes et al.

(10) Patent No.: US 12,498,302 B2
(45) Date of Patent: Dec. 16, 2025

(54) SYSTEMS AND METHODS FOR MESO-DISSECTION

(71) Applicant: Roche Molecular Systems, Inc., Pleasanton, CA (US)

(72) Inventors: Michael Barnes, Oro Valley, AZ (US); Srinivas Chukka, San Jose, CA (US); Mohammad Qadri, San Ramon, CA (US)

(73) Assignee: Roche Molecular Systems, Inc., Pleasanton, CA (US)

( * ) Notice: Subject to any disclaimer, the term of this patent is extended or adjusted under 35 U.S.C. 154(b) by 145 days.

(21) Appl. No.: 18/234,625

(22) Filed: Aug. 16, 2023

(65) Prior Publication Data

US 2023/0393036 A1    Dec. 7, 2023

Related U.S. Application Data

(60) Continuation of application No. 17/401,103, filed on Aug. 12, 2021, now Pat. No. 11,768,136, which is a
(Continued)

(51) Int. Cl.
*G01N 1/00* (2006.01)
*G01N 1/28* (2006.01)
(Continued)

(52) U.S. Cl.
CPC ........... *G01N 1/286* (2013.01); *G06T 7/0014* (2013.01); *G06T 7/33* (2017.01);
(Continued)

(58) Field of Classification Search
None
See application file for complete search history.

(56) References Cited

U.S. PATENT DOCUMENTS

| | | |
|---|---|---|
| 281,695 A | 7/1883 | Holcombe et al. |
| 3,238,889 A | 3/1966 | Huber et al. |

(Continued)

FOREIGN PATENT DOCUMENTS

| | | |
|---|---|---|
| AU | 2002233157 A1 | 7/2002 |
| CN | 101018502 A | 8/2007 |

(Continued)

OTHER PUBLICATIONS

A mill-based instrument and software system for dissecting slide-mounted tissue that provides digital guidance and documentation, BMC Clinical Pathology, (2013), p. 29, vol. 13 No. 1) (Year: 2013).*

(Continued)

*Primary Examiner* — Jyoti Nagpaul
(74) *Attorney, Agent, or Firm* — Charney IP Law LLC; Thomas M. Finetti

(57) ABSTRACT

The subject disclosure provides systems, computer-implemented methods, and clinical workflows for meso-dissection of biological specimens and tissue slides by incorporating annotation and inter-marker registration modules within digital pathology imaging and meso-dissection (or milling) systems. Images of a reference slide a milling slide may be acquired using the same imaging system, with the annotations on the image associated with the milling slide being based on the inter-marker registration. Each image along with its respective annotations and meta-data may be associated with a project or a case and stored in an image management system. A same-marker registration may be used to map annotations from the annotated image of the milling slide to a live image of the milling slide. The milling slide may be milled based on the annotations, with milled tissue output into a contained that is labeled in association with the labeled input slides.

16 Claims, 6 Drawing Sheets

Related U.S. Application Data division of application No. 15/659,566, filed on Jul. 25, 2017, now Pat. No. 11,125,660, which is a continuation of application No. PCT/EP2016/051894, filed on Jan. 29, 2016.

(60) Provisional application No. 62/110,477, filed on Jan. 31, 2015.

(51) Int. Cl.
    *G06T 7/00*     (2017.01)
    *G06T 7/33*     (2017.01)
    *G01N 1/38*     (2006.01)

(52) U.S. Cl.
CPC ............... *G01N 2001/2873* (2013.01); *G01N 2001/383* (2013.01); *G01N 2800/00* (2013.01); *G06T 2207/10056* (2013.01); *G06T 2207/30024* (2013.01)

(56) References Cited

U.S. PATENT DOCUMENTS

| | | |
|---|---|---|
| 3,732,858 A | 5/1973 | Banko |
| 4,320,761 A | 3/1982 | Haddad |
| 4,679,446 A | 7/1987 | Sheehan et al. |
| 5,218,645 A | 6/1993 | Bacus |
| 5,428,690 A | 6/1995 | Bacus et al. |
| 5,456,125 A | 10/1995 | Gagne |
| 5,511,556 A | 4/1996 | DeSantis |
| 5,817,955 A | 10/1998 | Gherson et al. |
| 5,843,644 A | 12/1998 | Liotta et al. |
| 5,843,657 A | 12/1998 | Liotta et al. |
| 5,925,834 A | 7/1999 | Sgourakes |
| 6,010,888 A | 1/2000 | Liotta et al. |
| 6,135,946 A | 10/2000 | Konen et al. |
| 6,161,442 A | 12/2000 | Sgourakes |
| 6,204,030 B1 | 3/2001 | Liotta et al. |
| 6,251,516 B1 | 6/2001 | Bonner et al. |
| 6,342,143 B1 | 1/2002 | Minden |
| 6,565,728 B1 | 5/2003 | Kozulic |
| 6,602,071 B1 | 8/2003 | Ellion et al. |
| 6,673,086 B1 | 1/2004 | Hofmeier et al. |
| 6,684,720 B2 | 2/2004 | Sgourakes |
| 6,702,990 B1 | 3/2004 | Camacho et al. |
| 7,093,508 B2 | 8/2006 | Harris |
| 7,185,551 B2 | 3/2007 | Schwartz |
| 7,473,401 B1 | 1/2009 | Baer |
| 7,482,169 B2 | 1/2009 | Gjerde et al. |
| 7,673,531 B2 | 3/2010 | May et al. |
| 7,794,664 B2 | 9/2010 | Pelletier et al. |
| 7,803,634 B2 | 9/2010 | Klimov et al. |
| 7,883,666 B2 | 2/2011 | Ting et al. |
| 7,907,259 B2 | 3/2011 | Sagmuller et al. |
| 8,293,497 B2 | 10/2012 | Schutze |
| 8,431,078 B2 | 4/2013 | Schutze et al. |
| 8,545,517 B2 | 10/2013 | Bodduluri et al. |
| 8,668,872 B2 | 3/2014 | Klimov et al. |
| 8,870,788 B2 | 10/2014 | Pesce et al. |
| 9,028,757 B2 | 5/2015 | Klimov et al. |
| 9,101,351 B2 | 8/2015 | Thompson et al. |
| 9,200,989 B2 | 12/2015 | Niehren |
| 9,547,898 B2 | 1/2017 | Häll et al. |
| 2002/0091441 A1 | 7/2002 | Guzik |
| 2002/0108857 A1 | 8/2002 | Paschetto et al. |
| 2002/0134175 A1 | 9/2002 | Mehra et al. |
| 2003/0179916 A1 | 9/2003 | Magnuson et al. |
| 2004/0053326 A1 | 3/2004 | Emmert-Buck et al. |
| 2004/0142488 A1 | 7/2004 | Gierde et al. |
| 2005/0042692 A1 | 2/2005 | Star et al. |
| 2005/0175511 A1 | 8/2005 | Cote et al. |
| 2005/0250211 A1 | 11/2005 | Reinhardt et al. |
| 2006/0074346 A1 | 4/2006 | Hibner |
| 2006/0243110 A1 | 11/2006 | Ostermann et al. |
| 2007/0086917 A1 | 4/2007 | Lemme et al. |
| 2007/0271179 A1 | 11/2007 | Kubota |
| 2008/0019878 A1 | 1/2008 | Trump |
| 2008/0148913 A1 | 6/2008 | Chen et al. |
| 2008/0161842 A1 | 7/2008 | Ting et al. |
| 2008/0235055 A1 | 9/2008 | Mattingly et al. |
| 2010/0000383 A1 | 1/2010 | Koos et al. |
| 2010/0145326 A1 | 6/2010 | Hoey et al. |
| 2011/0104642 A1 | 5/2011 | Luksch et al. |
| 2012/0045790 A1 | 2/2012 | Van Dijk et al. |
| 2013/0344500 A1 | 12/2013 | Trautman et al. |
| 2014/0098214 A1 | 4/2014 | Schlaudraff et al. |
| 2014/0329269 A1 | 11/2014 | Adey et al. |
| 2014/0348410 A1 | 11/2014 | Grunkin et al. |
| 2014/0356876 A1 | 12/2014 | Ragan |
| 2015/0316478 A1 | 11/2015 | Klimov et al. |
| 2016/0116729 A1 | 4/2016 | Casas et al. |
| 2017/0322124 A1 | 11/2017 | Barnes et al. |
| 2017/0328817 A1 | 11/2017 | Barnes et al. |
| 2018/0025210 A1 | 1/2018 | Remiszewski et al. |
| 2018/0149561 A1 | 5/2018 | Schlaudraff et al. |
| 2018/0340870 A1 | 11/2018 | Gustafson et al. |

FOREIGN PATENT DOCUMENTS

| | | |
|---|---|---|
| CN | 101267546 A | 9/2008 |
| CN | 201262598 Y | 6/2009 |
| CN | 101543413 A | 9/2009 |
| CN | 103384818 A | 11/2013 |
| CN | 103443609 B | 1/2016 |
| DE | 19818425 A1 | 7/1999 |
| EP | 1067374 B1 | 3/2013 |
| EP | 1969340 B1 | 7/2019 |
| JP | S62292144 A | 12/1987 |
| JP | H07184908 A | 7/1995 |
| JP | 2001500772 A | 1/2001 |
| JP | 2001041864 A | 2/2001 |
| JP | 2004069666 A | 3/2004 |
| JP | 2004258017 A | 9/2004 |
| JP | 2006506672 A | 2/2006 |
| JP | 2006518654 A | 8/2006 |
| JP | 2007209360 A | 8/2007 |
| JP | 2007286697 A | 11/2007 |
| JP | 2009103701 A | 5/2009 |
| JP | 2010-267092 A | 11/2010 |
| JP | 2012198234 A | 10/2012 |
| JP | 2013506835 A | 2/2013 |
| JP | 5215969 B2 | 6/2013 |
| JP | 2013-195133 A | 9/2013 |
| JP | 2013178825 A | 9/2013 |
| JP | 2013245988 A | 12/2013 |
| JP | 2013245998 A | 12/2013 |
| JP | 2014-504728 A | 2/2014 |
| KR | 100271053 B1 | 11/2000 |
| KR | 20020085123 A | 11/2002 |
| KR | 20050027607 A | 3/2005 |
| KR | 20050027609 A | 3/2005 |
| WO | 2000057153 A1 | 9/2000 |
| WO | 2002037159 A2 | 5/2002 |
| WO | 2002057746 A2 | 7/2002 |
| WO | 2004045768 A1 | 6/2004 |
| WO | 2006011510 A1 | 2/2006 |
| WO | 2006123967 A2 | 11/2006 |
| WO | 2007076934 A1 | 7/2007 |
| WO | 2008156566 A1 | 12/2008 |
| WO | 2009008843 A1 | 1/2009 |
| WO | 2010093861 A2 | 8/2010 |
| WO | 2010125495 A2 | 11/2010 |
| WO | 2012102779 A2 | 8/2012 |
| WO | 2012115948 A1 | 8/2012 |
| WO | 2012102779 A3 | 9/2012 |
| WO | 2014140070 A2 | 9/2014 |
| WO | 2014140070 A3 | 11/2014 |
| WO | 2016120433 A1 | 8/2016 |
| WO | 2020057746 A1 | 3/2020 |

(56) References Cited

OTHER PUBLICATIONS

A mil-based instrument and software system for dissecting slide mounted tissue that provides digital guidance and documentation, BMC Clinical Pathology, (2013), p. 29, vol. 13 No. 1.*

Suarez-Quian et al., "Laser Capture Microdissection: A New Tool for the Study of Spermatogenesis," Journal of Andrology, vol. 21, No. 5, Sep./Oct. 2000.

Walker et al., "Quantitative PCR for DNA identification absed on genome-specific interspersed repetitive elements," Genomics 83 (2004) 518-527.

Moelans et al., "HER-2/neu amplification testing in breast cancer by Multiplex Ligation-dependent Probe Amplification: Influence of manual- and laser microdissection," BMC Cancer 2009, 9:4.

International Search Report and Written Opinion, dated May 2, 2016.

Nils Adey et al: "A mill based instrument and software system for dissecting slide-mounted tissue that provides digital guidance and documentation", BMC Clinical Pathology, Biomed Central, London, GB, vol. 13, No. 1, Nov. 5, 2013 (Nov. 5, 2013), pp. 29, XP021166143, ISSN: 1472-6890, DOI: 10.1186/1472-6890-13-29.

Adey, N. et al.; "A mill based instrument and software system for dissecting slide-mounted tissue that provides digital guidance and documenation" BMC Clinical Pathology, (2013) p. 29; vol. 13 No. 1.

Beltinger et al.; A simple combined microdissection and aspiration device for the rapid procurement of single cells from clinical peripheral blood smears; Molecular Pathology; 1998; pp. 233-236; vol. 51.

De Bruin et al; Macrodissection versus microdissection of rectal carcinoma: minor influence of stroma cells to tumor cell gene expression profiles; BMC Genomics; Oct. 14, 2005; 10 pages; vol. 6, No. 142; BioMed Central.

Extended European search report issued Aug. 29, 2017, in EP Application No. EP 11 85 7029, filed Nov. 16, 2011, 11 pages.

Going et al.; Practical histological microdissection for PCR analysis; The Journal of Pathology; May 1996; pp. 121-124; vol. 179, Issue 1; John Wiley & Sons, Ltd.

Going; Histological microdissection in diagnostic and investigative pathology; Diagnostic Histopathology; Jan. 2010; pp. 43-48; vol. 16, Issue 1; Elsevier.

Hernandez et al.; Manual versus laser micro-dissection in molecular biology; Ultrastructural Pathology; 2006; pp. 221-228; vol. 30, No. 3; Informa Healthcare.

http:/en.nanotec.com/hollowshaft_steppermotors.html.
http://www.andrologyjournal.org/cgi/reprint/21/5/601.pdf.
http://www.dell.com/us/p/inspiron-mini1018/pd?refid+inspiron-1018&s=dhs&cs=19.
http://www.dino-lite.com.
http://www.etaluma.com/Index.php.
http://www.griffinmotion.com/product-detail.asp?productid=20.
http://www.micromark.com/MicroLux-Micro-Milling-Machine.9683.html.
http://www.ncbi.nlm.nih.gov/pmc/articles/PMC2631004.
http://www.ncbi.nlm.nih.gov/pubmed/_12711348.
http://www.rolynoptics.thomasnet.com/item/d-microscope-sections-microscope-stages-and-mounts//mechanical-stage/80-5166-id-1769-?.

International Search Report and Written Opinion mailed on Jan. 29, 2016 in corresponding PCT/EP2016/051895 filed on Jan. 29, 2016, pp. 1-11.

International Search Report and Written Opinion mailed on Feb. 9, 2018 in corresponding PCT/EP2017/078623 filed on Nov. 8, 2017, pp. 1-13.

International Search Report and Written Opinion, dated May 2, 2016 for PCT/EP2016/051894.

Japanese office action dispatched on Aug. 23, 2018 in corresponding Japanese patent application No. 2017-539656.

Lee et al.; A simple, precise and economical microdissection technique for analysis of genomic DNA from archival tissue sections; Oct. 1998; pp. 305-309; vol. 433, Issue 4; Springer-Verlag.

Linton et al.; Preparation of formalin-fixed paraffin-embedded (FFPE) tissue for RNA extraction; BioTechniques; Nov. 2009; p. 54.

Martin et al.; Differences in the Tumor Microenvironment between African-American and European-American Breast Cancer Patients; PLoS One; Feb. 2009; 14 pages; vol. 4, Issue 2; www.plosone.org.

Office Action for Chinese application 201180069499.6 dated Jul. 10, 2015, 6 pages including English Translation.

Office Action for Chinese application 201180069499.6 dated Oct. 10, 2015, 4 pages including English Translation.

Office Action for Chinese application 201180069499.6 dated Oct. 20, 2014, 20 pages including English Translation.

PCT Application PCT/US2011/061075; Filing date Nov. 16, 2011; Adey Nils B et al.; International Search Report mailed Jul. 18, 2012.

Quistorff et al.; Simple Techniques for Freeze Clamping and for Cutting and Milling of Frozen Tissue at Low Temperature for the Purpose of Two- or Three-Dimensional Metabolic Studies in Vivo; Analytical Biochemistry; 1980; pp. 237-248; vol. 108; Academic Press, Inc.

Sarkar et al.; "A Robust Method for Inter-Marker Whole Slide Registration of Digital Pathology Images Using Lines Based Features" 11th International Symposium on Biomedical Imaging; Jul. 31, 2014.

Walker, et al.: Quantatative PCR for DNA identification based on genome-specific interspersed repetitive elements; Genomics; 2004; pp. 518-527; vol. 83; Elsevier.

* cited by examiner

SYSTEMS AND METHODS FOR MESO-DISSECTION

CROSS-REFERENCE TO RELATED APPLICATIONS

This patent application is a continuation of U.S. patent application Ser. No. 17/401,103 filed on Aug. 12, 2021, which application is a divisional of U.S. patent application Ser. No. 15/659,566 filed on Jul. 26, 2017, which application is a continuation of International Patent Application No. PCT/EP2016/051894 filed Jan. 29, 2016, which claims priority to, and the benefit of U.S. Provisional Application No. 62/110,477 filed Jan. 31, 2015. Each of the above patent applications are hereby incorporated by reference herein in their entireties.

FIELD OF THE SUBJECT DISCLOSURE

The present subject disclosure relates to imaging for medical diagnosis. More particularly, the present subject disclosure relates to automated micro-dissection (meso-dissection) of slide-mounted tissue slides guided by digital pathology.

BACKGROUND OF THE SUBJECT DISCLOSURE

In the analysis of biological specimens such as tissue sections, blood, cell cultures and the like, biological specimens are mounted on a slide, stained with one or more combinations of stain and biomarkers, and the resulting assay is viewed or imaged for further analysis. Observing the assay enables a variety of processes, including diagnosis of disease, assessment of response to treatment, and development of new drugs to fight disease. An assay includes one or more stains conjugated to an antibody that binds to protein, protein fragments, or other objects of interest in the specimen. Subsequent to staining, the assay may be imaged for further analysis of the contents of the tissue specimen. Further, either stained or unstained sections of the tissue specimen may also be physically dissected for further molecular or genomic analysis. For instance, dissection of slide-mounted tumor samples is often used to enrich cancer cells in order to generate better signal to noise ratios in subsequent biochemical characterization. Many clinical laboratories utilize manual dissection for practical reasons and to avoid the expense and difficulties of laser microdissection systems. Unfortunately, manual methods often lack resolution and process traceability and documentation. Meso-dissection systems provide better precision than manual methods while also providing digital image guidance and electronic process documentation. Existing slide-mounted tissue meso-dissection systems such as those manufactured by AvanSci Bio® (details at http://avanscibio.com/uploads/CDP-08_MesoDissection_System_Flyer_Rev_1.pdf) provide better precision than manual methods while also providing digital image guidance and electronic process documentation. A meso-dissection system may comprise a micro tissue mill that employs a specialized disposable mill bit that simultaneously dispenses liquid, cuts tissue from the slide-mounted tissue surface, and aspirates the liquid along with the displaced tissue fragments. The meso-dissection instrument also consists of an optical imaging system component—with a moving x-y stage to hold the tissue slides where one of the tissue slides, typically a H&E slide, is loaded on to the stage and imaged for the user to outline the annotations. This slide is referred to as reference slide. The tissue slide to be dissected, thus referred to as milling slide, is also loaded on the stage and live image captured for tissue extraction. These meso-dissection systems may further provide a software interface for enabling annotation of areas of interest and manually transferring annotations between the images of reference and milling slides that correspond to serially-cut tissue sections, enabling further guidance of the dissection and generation of an electronic record of the process.

Although existing meso-dissection systems are more effective than manual dissection methods and are applicable for biomarker analysis of biological samples, they are limited in multiple ways for wider usage. The system is deficient in specifying and constructing the annotations for milling. The annotations outlined on reference slide image have to be mapped to the milling slide image through a manually interactive image alignment and annotation mapping procedure on the meso-dissection system. Thus the accuracy of the mapping procedure is limited by the magnification (resolution) that of the meso-dissection system (around 5× microscope lens objective), which is lower that is required to accurately define desired region margins, such as tumor or immune region margins and much lower than possibly and typically done with a digital pathology system (20×, 40× microscope objective etc.), resulting in in the extracted tissue data being corrupted with other forms of tissue versus exclusively extracting the tissue from the desired biologically specific region.

The process of generating of milling annotations is crucial for getting the tissue for the specific diagnostic or biological purpose. Existing systems are designed to be operated in a sequential manner one slide at a time by a skilled professional, and the process of generating these annotations is a manually intensive process. These systems lack the flexibility to extract tissue from multiple tissue slides in a correlated manner, analyze and investigate molecular and genomic sequence analysis information from multiple regions and adjacent slides is of use of in pre-clinical drug discovery, development investigative studies and clinical prognostic and predictive analysis.

SUMMARY OF THE SUBJECT DISCLOSURE

The subject disclosure solves the above-identified problems by providing instruments or systems, computer-implemented methods, and clinical workflows for meso-dissection of biological specimens and tissue slides via a digital image capture of reference and milling slides on a digital pathology imaging system, using a digital pathology software application to generate milling annotations on the digitized high-resolution image of the milling slide either by annotating directly or mapping of annotations from the scanned high-magnification images of reference slides to milling images making use of automated inter-marker registration operations, and then processing one or more milling slides based on the annotated milling images on a meso-dissection system that is primarily used for milling purposes. A plurality of slides corresponding to adjacent sections of a tissue sample are digitally scanned at a desired high-resolution (20×, 40× etc.) using a digital pathology whole slide scanner to generate high-resolution images. Once digitized one or more images may be annotated to delineate areas of interest, either by an operator or by using image-analysis operations on any digital pathology whole slide image viewing application. One or more of the annotated images may be designated as a set of reference images. In a similar manner, one or more images may be designated as a group of milling images, i.e., the slides intended to be dissected by a meso-dissection or milling system. For example, a milling slide may be an unstained tissue slide. Images of the reference slides and milling slides may therefore be acquired using the same imaging system.

To generate the set of specific milling annotations for each of the milling slides, a user can select an intended set of reference annotations from the reference images and may execute an inter-marker registration operation in the digital pathology software application to accurately register at the scanned high magnification and map the annotations from the corresponding reference images to the milling image. The milling image may represent a tissue slide that is stained with the same or a different stain combination. The milling slide may be an unstained tissue slide. Images of the reference slides and milling slides may therefore be acquired using the same imaging system, with the annotations on the image associated with any milling slide being based on the inter-marker registration. Each image along with its respective annotations and meta-data may be associated with a project or a case and stored in an image management system. Further, the milling slides are loaded on the meso-dissection system and the corresponding milling images along with their milling annotations are imported from the image management system into the meso-dissection system invoked from the software interface on the meso-dissection system. For each of the slides to be milled, a live-image of the milling slide may be captured, and a same-marker registration may be used to map the annotations from the imported and annotated image to the live image of the slide being milled. Therefore, the process of milling an intended region on a milling slide on meso-dissection system requires only the import of the corresponding annotated milling image and without either any dependency on or needing to import and make further use any of the reference images. Therefore, the milling system is primarily used for milling and tissue extraction purpose. A milling slide may be milled based on the associated annotations, with milled tissue output into a container that is labeled in association with the labeled milled slides and the meta-data including the reference slides and annotation information.

Therefore, the proposed workflow makes it possible for all the labeled tissue slides from tissue blocks or patients being digitized on a high-resolution digital pathology system in a batch assembly mode and saved to an image management system. And for a pathologist or a medical professional to use the digital pathology software application offline on any computer to import, review the digital images and annotate on the images of the chosen reference slides and select the set of reference annotations for each of the slides to be milled. Once the reference annotations are outlined, inter-marker registration operation is executed on the computer to batch execute on all tissue datasets and output the corresponding milling annotations on the images of the slides to be milled and save them to an image management system. In an immediate or later session, a meso-dissection system technician or operator, without any further guidance or input from the medical professional, can physically load all the labelled milling slides and load them on the meso-dissection system and connect to the image management system to import the milling images and associated annotations. And for each of the slide to be physically milled, using the software interface on the dissection system, use same-marker registration operation to map milling annotations to the camera coordinate system of the live capture and collect the extracted tissue into the labelled container. Therefore, this overall workflow makes the digital pathology-guided meso-dissection system operational in a high-volume pre-clinical and clinical setting.

In one exemplary embodiment, the subject disclosure provides an instrument or system that combines a digital pathology imaging subsystem and a meso-dissection or milling subsystem. The system includes a processor and a memory coupled to the processor for storing computer-executable instructions that are executed by the processor to perform operations including using an intermarker registration operation to map annotations from a first image to one or more of a plurality of adjacent images including a milling image, and subsequently dissecting a milling slide corresponding to the milling image based on the annotations, wherein the annotations are mapped to a live-image of the milling slide.

In accordance with the embodiment, the first image and the plurality of adjacent images may correspond to serial sections of a tissue block. The first image and the milling image may correspond to the same milling slide. The operations may further comprise generating a milling annotation based on the annotations. The one or more annotations may comprise XML, data. The operations may further comprise associating the one or more annotations and a milled tissue sample from the milling slide with a patient. The associating may comprise using a unique identifier. A result of analysis of the milled tissue sample may also be associated with the patient. A result of analysis of the milled tissue sample may be used to determine one or more of a subsequent scanning operation or a subsequent milling operation. The annotations may be mapped to a live-image of each of the milling slides using a same-marker registration operation. Annotated areas of interest on the milling slide may subsequently be dissected based on the annotated live image.

In another exemplary embodiment, the subject disclosure provides the respective digital pathology imaging subsystem and the meso-dissection or milling subsystem for use in said combined system.

In another exemplary embodiment, the subject disclosure provides a digital pathology imaging instrument or system including a processor and a memory coupled to the processor for storing computer-executable instructions that are executed by the processor to perform operations including annotating a first image of a plurality of serial images of a tissue block, mapping one or more annotations from the first image to a milling image, and exporting the one or more annotations of the milling image to a milling system, wherein the milling system dissects a milling slide associated with the milling image based on the one or more annotations.

In accordance with the embodiment, the milling system may map the annotations from the annotated milling image to a live image of a milling slide using a same-marker registration operation. The mapping of annotations from the first image to the milling image may use an intermarker registration operation.

In yet another exemplary embodiment, the subject disclosure provides a milling or meso-dissection system or instrument including a processor and a memory coupled to the processor for storing computer-executable instructions that are executed by the processor to perform operations including importing one or more annotations from an imaging system, wherein the one or more milling annotations indicate regions of interest of a tissue specimen, said tissue specimen being one of a plurality of serial sections of a tissue block, and wherein said one or more milling annotations were generated on a workstation coupled to a scanner for scanning said tissue specimen, mapping the one or more annotations to a live image of a milling slide to generate milling annotations, and dissecting the milling slide based on the milling annotations.

In accordance with the embodiment, the mapping of annotations to the live image may be based on a same-marker registration operation. The annotations may be translated to a coordinate system of a milling system.

In yet another exemplary embodiment, the subject disclosure provides a computer-implemented method for combined digital pathology and meso-dissection. The method comprises the steps: mapping annotations from a first image to one or more of a plurality of adjacent images including a milling image; and subsequently dissecting a milling slide corresponding to the milling image based on the annotations; wherein the annotations are mapped to a live-image of the milling slide.

In accordance with the embodiment, the mapping of annotations from the first image to the milling image may use an intermarker registration operation. The milling system may map the annotations from the annotated milling image to a live image of a milling slide using a same-marker registration operation. The first image and the plurality of adjacent images may correspond to serial sections of a tissue block. The one or more milling annotations may indicate regions of interest of a tissue specimen, said tissue specimen being one of a plurality of serial sections of a tissue block. The one or more milling annotations may be generated on a workstation coupled to a scanner for scanning said tissue specimen.

Specifically, the method may be performed by said system. Therefore, the features disclosed with regard to the system are understood to be disclosed with respect to the method, accordingly.

In yet another exemplary embodiment, the subject disclosure provides an instrument for combined digital pathology and meso-dissection, comprising: a processor; and a memory coupled to the processor, the memory to store computer-readable instructions that, when executed by the processor, cause the processor to perform one of said methods.

In yet another exemplary embodiment, the subject disclosure provides a digital pathology instrument, equipped for being used in one of said methods, comprising: a processor; and a memory coupled to the processor, the memory to store computer-readable instructions that, when executed by the processor, cause the processor to perform operations comprising: mapping annotations from a first image to one or more of a plurality of adjacent images including a milling image; and exporting the one or more annotations of the milling image to a milling system.

In yet another exemplary embodiment, the subject disclosure provides a meso-dissection instrument, equipped for being used in one of said methods, comprising: a processor; and a memory coupled to the processor, the memory to store computer-readable instructions that, when executed by the processor, cause the processor to perform operations comprising: importing one or more annotations from an imaging system, and dissecting a milling slide corresponding to the milling image based on the annotations; wherein the annotations are mapped to a live-image of the milling slide.

DETAILED DESCRIPTION OF THE SUBJECT DISCLOSURE

Figure 1:
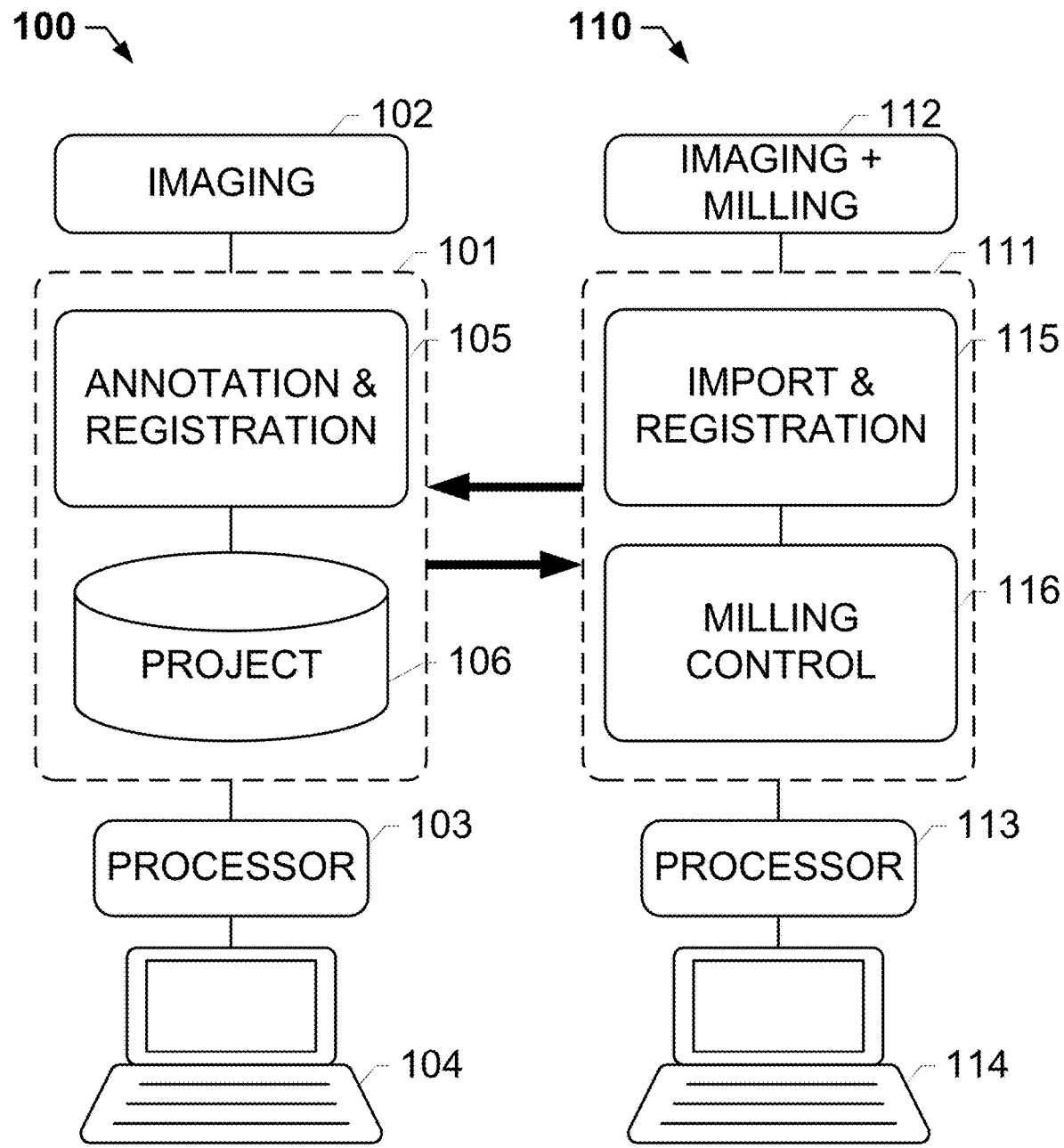
FIG. 1 depicts a digital pathology system comprising separate imaging and milling subsystems, according to an exemplary embodiment of the subject disclosure.

The subject disclosure solves the above-identified problems by providing instruments or systems, computer-implemented methods, and clinical workflows for meso-dissection of biological specimens and tissue slides via a digital image capture of reference and milling slides on a digital pathology imaging system, using a digital pathology software application to generate milling annotations on the digitized high-resolution image of the milling slide either by annotating directly or mapping of annotations from the scanned high-magnification images of reference slides to milling images making use of automated inter-marker registration operations, and then processing one or more milling slides based on the annotated milling images on a meso-dissection system that is primarily used for milling purposes. A plurality of slides corresponding to adjacent sections of a tissue sample are digitally scanned at a desired high-resolution (20×, 40× etc.) using a digital pathology whole slide scanner to generate high-resolution images. Once digitized one or more images may be annotated to delineate areas of interest, either by an operator or by using image-analysis operations on any digital pathology whole slide image viewing application. One or more of the annotated images may be designated as a set of reference images. In a similar manner, one or more images may be designated as a group of milling images, i.e., the slides intended to be dissected by a meso-dissection or milling system. For example, a milling slide may be an unstained tissue slide. Images of the reference slides and milling slides may therefore be acquired using the same imaging system.

To generate the set of specific milling annotations for each of the milling slides, a user can select an intended set of reference annotations from the reference images and may execute an inter-marker registration operation in the digital pathology software application to accurately register at the scanned high magnification and map the annotations from the corresponding reference images to the milling image. The milling image may represent a tissue slide that is stained with the same or a different stain combination. The milling slide may be an unstained tissue slide. Images of the reference slides and milling slides may therefore be acquired using the same imaging system, with the annotations on the image associated with any milling slide being based on the inter-marker registration. Each image along with its respective annotations and meta-data may be associated with a project or a case and stored in an image management system. Further, the milling slides are loaded on the meso-dissection system and the corresponding milling images along with their milling annotations are imported from the image management system into the meso-dissection system invoked from the software interface on the meso-dissection system. For each of the slides to be milled, a live-image of the milling slide may be captured, and a same-marker registration may be used to map the annotations from the imported and annotated image to the live image of the slide being milled. Therefore, the process of milling an intended region on a milling slide on meso-dissection system requires only the import of the corresponding annotated milling image and without either any dependency on or needing to import and make further use any of the reference images. Therefore, the milling system is primarily used for milling and tissue extraction purpose. A milling slide may be milled based on the associated annotations, with milled tissue output into a container that is labeled in association with the labeled milled slides and the meta-data including the reference slides and annotation information.

Therefore, the proposed workflow makes it possible for all the labeled tissue slides from tissue blocks or patients being digitized on a high-resolution digital pathology system in a batch assembly mode and saved to an image management system. A pathologist or a medical professional may use the digital pathology software application offline on any computer to import, review the digital images and annotate on the images of the chosen reference slides and select the set of reference annotations for each of the slides to be milled. Once the reference annotations are outlined, an inter-marker registration operation may be executed on the computer to batch execute on all tissue datasets and output the corresponding milling annotations on the images of the slides to be milled and save them to an image management system. In an immediate or later session, a meso-dissection system technician or operator, without any further guidance or input from the medical professional, can physically load all the labelled milling slides and load them on the meso-dissection system and connect to the image management system to import the milling images and associated annotations. For each slide to be physically milled, using the software interface on the dissection system, a same-marker registration operation to map milling annotations to the camera coordinate system of the live capture and collect the extracted tissue into the labelled container. Therefore, this overall workflow makes the digital pathology-guided meso-dissection system operational in a high-volume pre-clinical and clinical setting.

FIG. 1 depicts a digital pathology system comprising separate subsystems for imaging 100 and milling 110, according to an exemplary embodiment of the subject disclosure. Imaging subsystem 100 may comprise hardware and software for generating an image of an assay or a plurality of assays. For example, imaging subsystem 100 may comprise a memory 101, which stores a plurality of processing modules or logical instructions that are executed by processor 103 coupled to computer 104. Besides processor 103 and memory 101, computer 104 may also include user input and output devices such as a keyboard, mouse, stylus, a display/touchscreen, and networking elements. For example, execution of processing modules within memory 101 may be triggered by user inputs, as well as by inputs provided over a network from a network server or database for storage and later retrieval by computer 104. Imaging subsystem 100 may comprise of a whole slide scanner such as Ventana iScan HT or iScan Coreo, or whole-slide image management system such as VIRTUOSO® or SCANSCOPE®.

Imaging subsystem 100 may further comprise imaging components 102, such as a digital microscope or a whole-slide scanner. Imaging components 102 depend on the type of image being generated. For instance, the sample may have been stained by means of application of a staining assay containing one or more different biomarkers associated with chromogenic stains for brightfield imaging or fluorophores for fluorescence imaging, with imaging hardware 102 comprising one or more of a brightfield RGB camera or a fluorescence imaging system. Imaging subsystem 100 may generate a plurality of images corresponding to serial sections of a tissue block, such as a biopsy taken from a patient thought to be suffering from cancer. Each serial section may be mounted on an individual slide and stained with a different combination of stains and biomarkers, resulting in a plurality of assays depicting adjacent tissue sections. The images may be scanned at any zoom level such as 20×, 40×, etc. specified by a pathologist, and may depict from any type of biological feature, such as H&E or any other IHC, ISH, cytology (urinal, blood smear thin prep, air dried, touch prep, cell block) CTC, and/or hematology slide of interest. These images and other information such as information about a target tissue type or object, as well as an identification of a staining and/or imaging platform, which and how many specific antibody molecules bind to certain binding sites or targets on the tissue, such as a tumor marker or a biomarker of specific immune cells, etc., are provided by imaging components 102 to memory 101 to be processed according to logical modules stored thereon. Moreover, a biological question/requested diagnosis by a pathologist may be provided along with patient information that enables tracking and associating subsequent processing results with a database record for the patient being diagnosed.

For example, an annotation and registration module 105 may receive the images and data and may enable selections of annotations of portions of images, and registration of these annotations to images of adjacent tissue slides. One or more images may be designated as a reference image that is presented on an interface enabling a user to designate areas or objects of interest, and label and annotate these areas of interest for milling, or for other diagnostic and processing purposes. Annotations may depict clinically relevant regions such as immune or tumor regions where the particular biomarker expression is high. The annotations can be either the complete or sub-regions of tumor or any other biologically meaningful non-tumor components, such as a lymphatic region, heterogeneous regions, IHC marker sub-type regions, etc. Annotations may also be automatically generated using image analysis operations for detecting and/or segmenting objects or areas of interest within the reference image(s). For example, automated image analysis operations may detect desired tissue types such as tumors, lymphatic regions in H&E slide, etc., or hot spots of high marker expression in IHC stained slides like any tumor, immune or vessel markers tumor markers, immune markers, etc. The reference image may depict an H&E slide.

A registration component of annotation and registration module 105 may be invoked to transfer annotations from said reference image to one or more adjacent images. For example, one or more images may correspond to slides designated to be dissected by milling system 110. These images, hereinafter referred to as "milling images", may further be automatically annotated with the areas of interest using, for example, an inter-marker or same-marker registration operation. The milling annotations can be custom specific for each milling slide, constructed from a corresponding subset of reference annotations chosen to reflect or analyze a certain biological question. Exemplary registration operations across assays with different combinations of stains and markers use an inter-marker operation, such as methods further described with reference to commonly-assigned and co-pending EP patent application WO2014140070A2, the contents of which are hereby incorporated herein by reference in their entirety. Relevant sections of the incorporated patent application describe a computerized image registration process comprising selecting a first digital image of a first tissue section from a set of digital images of adjacent tissue sections of a single patient, selecting a second digital image of a second tissue section from the set, matching tissue structure between the first digital image and the second digital image, and automatically mapping an annotation drawn on the first digital image to the second digital image. The first digital image may be derived from an image obtained using a stain and an imaging mode, and the second digital image may be derived from an image obtained using a different stain, a different imaging mode, or both as compared to the first digital image. The stain may be chosen from a hematoxylin and eosin stain ('H&E' stain), an immunohistochemistry stain ('IHC" stain), or a fluorescent stain. The imaging mode may be chosen from brightfield microscopy or fluorescent microscopy. A matching tissue structure may comprise a coarse registration mode comprising: generating a first gray-level tissue foreground image from the first digital image and generating a second gray-level tissue foreground image from the second digital image, computing a first tissue binary edge map from the first gray-level tissue foreground image and computing a second tissue binary edge map from the second gray-level tissue foreground image, computing global transformation parameters to align the first binary edge map and the second binary edge map, and, mapping the first digital image and the second digital image to a common big grid encompassing both the first and second digital images based on the global transformation parameters. Computing global transformation parameters may further comprise using a moments-based mapping method to generate an affine mapping between the first binary edge map and the second binary edge map. A fine registration mode may be used to refine alignment of the first digital image and the second digital image. The fine registration mode comprises annotating the first digital image, mapping the annotation on the common big grid to a corresponding location in the second digital image, and updating the location using Chamfer-distance matching based on the binary tissue edge maps. Cropped versions of the tissue edge binary maps may be used, and the method may further comprise selecting a minimum cost window which improves matching relative to coarse mode registration.

Another exemplary registration method performed by annotation and registration module 105 may include a same-marker line-based registration operation, including modeling the boundary regions of tissue samples reflected in the slides with line segments, then matching sets of line-segment between tissue samples (i.e., between slide images) to obtain an overall global transformation, i.e., coarse matching. In some embodiments, the line-based coarse matching approach is able to align images even in cases of mismatch between images (for example wear-and-tear effects, Area of Interest mismatches which can occur when the area of a physical slide picked up by the scanner for high-resolution scanning varies between adjacent sections, rotation up to 180 degrees, and horizontal and vertical flips), such as when greater than 50% of lines may be matched between the two images. In further embodiments, an additional finer sub-image registration process involving normalized, correlation-based, block matching on gradient magnitude images may be executed to compute local refinements between globally-aligned images. This registration method is further described with reference to commonly-assigned and co-pending U.S. patent application 61/885,024, the contents of which are hereby incorporated herein by reference in their entirety. This same-marker registration method may be used when the milling image represents an unstained slide, and the annotations are intended to be mapped from a milling image to a live image capture of a milling slide. Any other registration method may be used so long as it provides automated mapping of annotations across images having different stains, in a manner that enables precise milling of areas of interest based on annotated reference slides or enables registration of stained and unstained slides.

The images associated with the patient, including any annotated images, reference images, and milling images, as well as any additional metadata including annotations in XML or other formats, and assay information, may be stored in a project database 106. Project database 106 enables imaging subsystem 100 to export one or more projects or image collections along with annotations to other external systems, such as milling subsystem 110. Project database 106 may comprise or include an image management system (IMS).

As described herein, annotations of milling images may be imported into existing meso-dissection or milling systems such as milling subsystem 110, thereby improving the ability to use high-resolution milling annotations for a live-image of a milling slide intended to be dissected by milling subsystem 110. Milling subsystem 110 may comprise hardware and software for meso-dissection of one or more tissue slides or milling slides into specific containers associated with the image project, or the patient under diagnosis. For example, milling subsystem 110 may comprise a memory 111, which stores a plurality of processing modules or logical instructions that are executed by processor 113 coupled to computer 114. Besides processor 113 and memory 111, computer 114 may also include user input and output devices such as a keyboard, mouse, stylus, a display/touchscreen, and networking elements. For example, execution of processing modules within memory 111 may be triggered by user inputs, as well as by inputs provided over a network from a network server or database for storage and later retrieval by computer 114.

Milling subsystem 110 may further comprise imaging and milling components 112, such as a camera mounted on a milling platform and hardware for capturing milled or dissected tissue into labeled containers. Typically, this camera is a camera with a lower-magnification than that of the digital pathology systems used to digitize tissue slides. An object such as a tissue slide may be attached to a platform or stage capable of controlled X and Y axis movement such that it can be driven against a fixed rotating cutting bit, thereby shaping the object. A plastic mill bit may simultaneously dispense liquid, cut tissue, and aspirate the tissue fragments from the surface of the glass slide. Because tissue is relatively soft compared to glass, a spring pressure-controlled system may be used such that the blade rests on the slide surface with sufficient downward force to cut through the tissue but glides across the glass slide. Milling tissue from glass slides also provides the opportunity to place a digital microscope below the slide in order to view the process, direct the dissection, and generate digital documentation.

Memory 111 of milling subsystem 112 may store an import and registration module 115 to import annotations and images from imaging subsystem 100, and to control milling hardware 112 to dissect tissue slides based on the annotations. Generally, prior art milling systems include software that provides an interface enabling a user to digitally indicate areas of interest or to manually align an imported annotated reference image over a magnified live view of a milling slide. However, the import and registration module 115 of the present embodiment enables automated mapping of annotations from any slide from project database 106 to a live-capture of a milling slide using a registration operation such as a same-marker registration operation to enable more precise dissections. The live image of the milling slide may be captured at a user-specified zoom level. The annotations may be imported as a .XML file, or any combination of an XML and image file, enabling the annotations to be translated to a format that enables mapping the annotations to the image of the milling slide. The XML file may include geometric information about polygons and contours of the annotations, including and excluding regions or areas of interest. Annotations from a plurality of reference images may be imported, enabling multiple areas of interest to be dissected from a milling slide. High resolution annotations may be imported to improve the quality of milling.

Importing annotations eliminates the need to load a reference slide or import a reference image into milling subsystem 110. By providing real-time communication between imaging subsystem 100 and milling subsystem 110, and by providing common registration mechanisms in both subsystems, it may be possible for an operator of a digital pathology workstation of imaging subsystem 100 to interact with a live-capture component of milling subsystem 100. For example, in exemplary embodiments of the subject disclosure, the import and registration module 115 may export a live-image of a milling slide captured by imaging and milling components 112 to an imaging subsystem 100. Annotations may be registered onto the live-image on imaging subsystem 100, and milling annotations provided to milling control module 116 to control the milling process. This enables a remote operator on a digital pathology workstation to control milling operations on an external milling subsystem.

Moreover, universal importation of annotations from differently-stained slides stored in project database 106 enables dissection of not only unstained tissue slides, but also stained tissue slides, once the coverslip is removed. In some embodiments of the subject disclosure, the same tissue that is used as a reference image may also be used for milling purposes. A same-marker registration operation may be used to transfer annotations across images stained with the same assay, whereas an inter-marker or feature-based registration may be used to map annotations to unstained images. For example, a milling image that represents an unstained slide may be annotated on imaging subsystem 100 as described above, imported into milling subsystem 110, and mapped onto a live image of the unstained slide to guide milling control module 116 to dissect the unstained slide. Additionally, the ability to import annotations enables mapping of said annotations from multiple reference images (digitized on a wholeslide scanner as described above) to a single or a set of multiple milling slides for tissue dissection. For example, given a tissue block from a patient where multiple individual biomarker slides such as H&E, ER, PR, HER2, ISH, etc. may be digitized and annotated individually, any desired combination of these annotations can be imported and automatically registered and mapped to the image of the milling slide. In addition to mapping annotations from reference images to milling slide images, milling subsystem 110 may provide an interface to fine-tune or adjust the annotations prior to milling. High-resolution milling annotations imported from imaging subsystem 102 may be mapped to the live image at a resolution appropriate for imaging and milling components 112 and depending on the zoom/magnification level of the live image.

Milling control module 116 performs dissection on the milling slides by following the annotations mapped from milling images to the live image of the milling slide. Milling control module 116 may further determine the necessary metrics for milling, including determining an optimal milling path on the milling slide based on the annotations, as well as determining a required diameter of the pipette and optimal volume of liquid to be dispensed for the tissue intended for dissection. This automated milling based on milling annotations generated from high-resolution registration and mapping reduces the burden of a technician or human operator manually annotating the milling slide image. Moreover, to enable flexible functionality and for different purposes, the milled annotations, which may be updated on the milling system, may be saved to computer storage and imported back into a digital pathology software application for any follow up use. Therefore, the annotation and registration across platforms is improved. Tissue that is milled based on the annotations is subsequently extracted for analysis into container(s) that are labeled in association with the project, or patient under diagnosis. For example, there may be multiple containers associated with a single milling slide, i.e., one container for each tissue type or region being dissected. Alternatively or in addition, multiple milling slides may be barcoded or otherwise labeled to correspond to a corresponding plurality of containers. The. containers may be tracked together along with the analysis results associated with the particular tissue specimen. The analysis can be any type of analysis, such as molecular and/or genetic sequence analysis. Results of the analysis may also be tracked using a similar labelling mechanism that links the reference/milling images in the project, the specific annotations used to generate the milled tissue, and the containers, with the biological specimen, or a patient's record.

As described above, the modules include logic that is executed by processors 105 and 115. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memories 101 and 111 that, in exemplary embodiments, may be a random-access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

Figure 2:
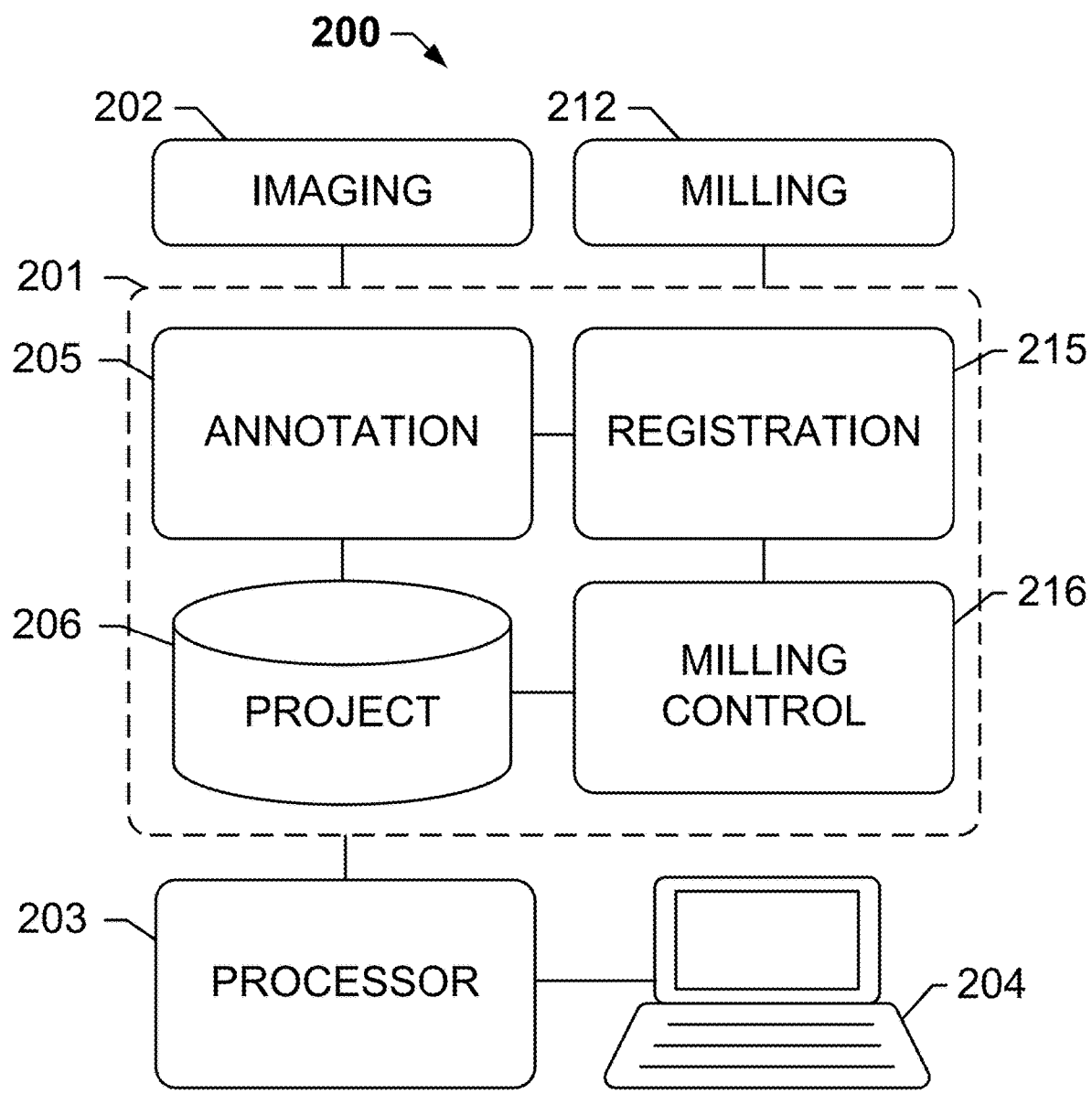
FIG. 2 depicts a digital pathology system comprising combined imaging and milling subsystems, according to an exemplary embodiment of the subject disclosure.

FIG. 2 depicts a digital pathology system 200 comprising combined imaging and milling subsystems, according to an exemplary embodiment of the subject disclosure. The embodiment of FIG. 2 combines the imaging subsystem 100 and milling subsystems 110 of FIG. 1, resulting in a system 200 that includes hardware and software for generating an image of an assay or a plurality of assays via imaging components 202 and for performing meso-dissection using milling components 212, with both imaging and milling components being controlled and operated through a common software application stored on, for instance, a memory 201, which stores a plurality of processing modules or logical instructions that are executed by processor 203 coupled to computer 204. Besides processor 203 and memory 201, computer 204 may also include user input and output devices such as a keyboard, mouse, stylus, a display/touchscreen, and networking elements. For example, execution of processing modules within memory 201 may be triggered by user inputs, as well as by inputs provided over a network from a network server or database for storage and later retrieval by computer 204.

As described with reference to imaging subsystem 100, imaging components 202 of system 200 include a camera mounted on a microscope or objective lens, or a whole-slide scanner having a microscope and/or a high-resolution camera capable of capturing RGB or fluorescent images at a 20× or 40× magnification, as well as a camera for generating a live image of a milling slide. Physical slide loading and handling systems, x-y stage to hold the tissue slides, optical imaging components such as camera, objective lens and other associated hardware for scanning and for milling may be independent or shared between scanning and milling components. Additional hardware and software adaptations to the integrated system can be added, including any hardware to transfer the tissue slides from the whole slide scanning subsystem to the meso-dissection system and any robotic instrumentation and associated hardware for an automated loading and unloading of the extracted tissue containers into the milling nozzle. Imaging components 202 may be used to generate a plurality of images corresponding to serial sections of a tissue block, with each serial section being mounted on an individual slide and stained with a different combination of stains and biomarkers, resulting in a plurality of assays depicting adjacent tissue sections. System 200 can share the hardware as well, for example, the same stage and the same camera can be used for scanning and milling. The images may be scanned at any zoom level specified by a pathologist, and may depict from any type of biological feature, such as H&E or any other IHC, ISH, cytology (urinal, blood smear thin prep, air dried, touch prep, cell block) CTC, and/or hematology slide of interest. These images and other information such as information about a target tissue type or object, as well as an identification of a staining and/or imaging platform, which and how many specific antibody molecules bind to certain binding sites or targets on the tissue, such as a tumor marker or a biomarker of specific immune cells, etc., are provided by imaging components 202 to memory 201 to be processed according to logical modules stored thereon.

An annotation module 205 may receive the images and may enable selections of annotations of portions of images, and registration module 215 may enable registration of these annotations to images of adjacent tissue slides as described above. For example, an interface may be provided for enabling a user to designate areas or objects of interest, and label and annotate these areas of interest for milling, or for other diagnostic and processing purposes. Annotations may also be automatically generated using image analysis operations. Registration module 215 may be invoked to transfer annotations from an annotated image to one or more adjacent images, including the milling images. Registration module 215 may execute any combination of an inter-marker or same-marker registration operation. For example, registration operations across assays with different combinations of stains and markers use an inter-marker operation, such as methods further described with reference to commonly-assigned and co-pending EP patent application WO2014140070A2, the contents of which are hereby incorporated herein by reference in their entirety. Registration operations across assays with the same stain combination may be performed by same-marker registration operations, such as those described with reference to commonly-assigned and co-pending U.S. patent application 61/885,024, the contents of which are hereby incorporated herein by reference in their entirety. Any other registration method may be used so long as it provides automated mapping of annotations across images having different stains, in a manner that enables precise milling of areas of interest based on annotated reference slides or enables registration of stained and unstained slides.

The images associated with the biological specimen, including any annotated images, reference images, and milling images, as well as any additional metadata including annotations, and assay information, may be stored in a project database or stored in a networking server storing images along with the annotations, shown in project database 206. The annotations may be saved in any format capable of exchanging annotations data, such as XML, JSON, SQL, INI or binary data or other formats. Project database 206 may include an image management system (IMS) for storing the high-resolution images of reference and milling slides along with other images of the tissue block. Any combination of annotations from project database 206 may be used to generate milling annotations for a live-image of a milling slide intended to be dissected. For example, registration module 215 enables automated mapping of annotations from any slide from project database 206 to a live-capture of a milling slide using an inter-marker or same-marker registration to enable more precise dissections. For example, a same-marker registration may be used to register annotations from a milling slide to a live-image capture of a milling slide mounted on milling components 212. The live image may be generated by imaging components 202 that include a camera mounted on a milling platform or stage comprised by milling components 212, which may further include hardware for capturing milled or dissected tissue into labeled containers. The live image may be captured at a user-specified zoom level that is the same or different than the zoom level at which the reference/milling images were originally captured. The camera used for whole slide scanning can be also commonly used with a different set of camera parameters to capture the live image capture of the milling slide.

A milling control module 216 may perform dissection on the milling slides by following the annotations mapped from milling images to the live image of the milling slide. Milling control module 216 may further determine the necessary metrics for milling, including determining an optimal milling path on the milling slide based on the annotations, as well as determining a required diameter of the pipette and optimal volume of liquid to be dispensed for the tissue intended for dissection. The milling/imaging stage may include an x-y table upon which the milling slide is mounted. Apparatus may be provided to remove a coverslip of any milling slide that is a stained slide. Tissue that is milled based on the annotations is subsequently extracted for analysis into containers that are labeled in association with the project, or patient under diagnosis. The analysis can be any type of analysis, such as molecular and/or genetic sequence analysis. Results of the analysis may also be tracked using a similar labelling mechanism that links the reference/milling images in the project, the specific annotations used to generate the milled tissue, and the container, with a patient's record.

As described above, the modules include logic that is executed by processors 205 and 215. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memories 201 and 211 that, in exemplary embodiments, may be a random-access memory (RAM), read-only memories (ROM), erasable/electrically erasable programmable read-only memories (EPROMS/EE-PROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

Figure 3:
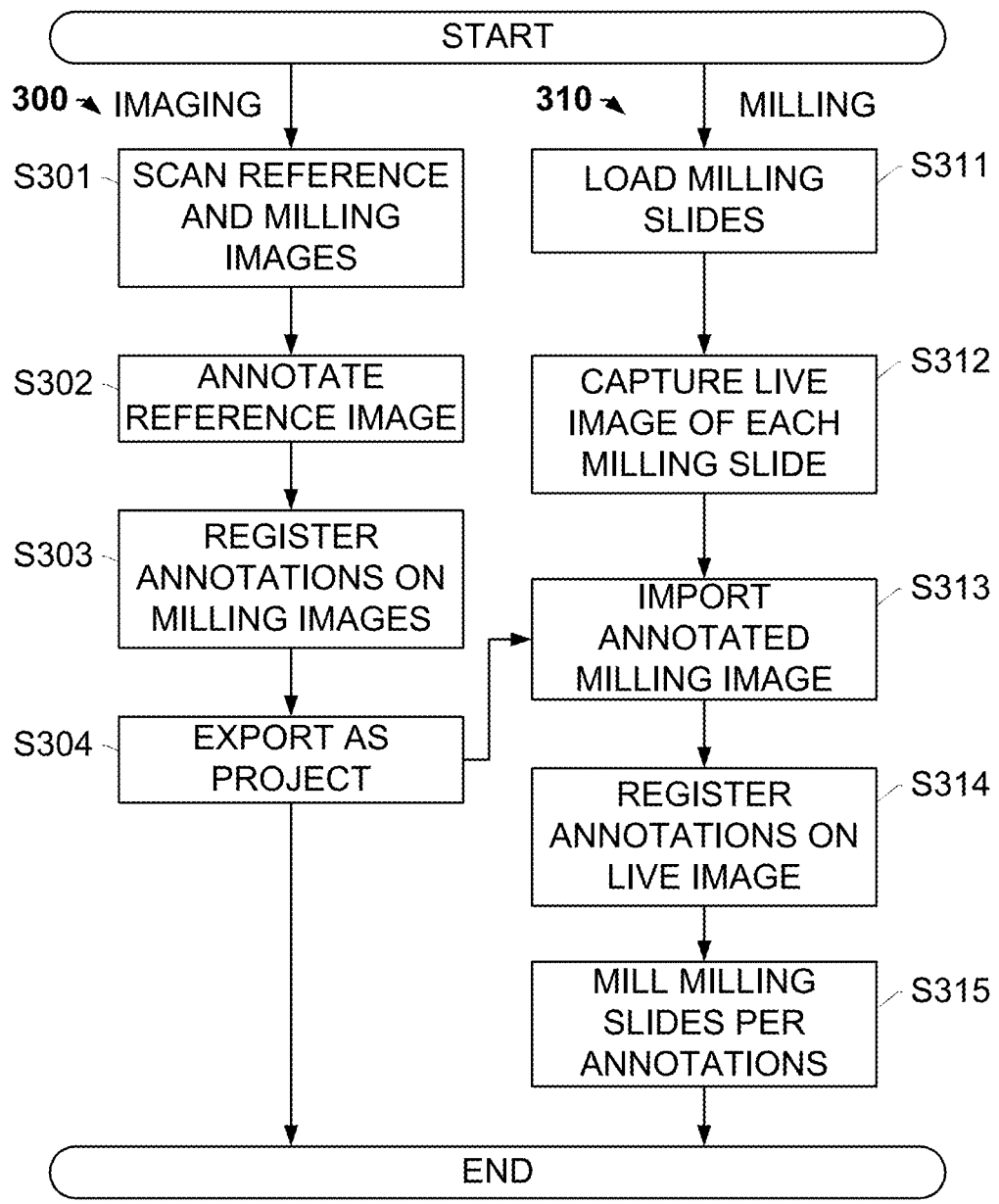
FIG. 3 depicts a method for meso-dissection using separate imaging and milling subsystems, according to an exemplary embodiment of the subject disclosure.

FIG. 3 depicts a method for meso-dissection using separate imaging and milling subsystems, according to an exemplary embodiment of the subject disclosure. The method of FIG. 3 may be executed by any combination of the modules depicted in the subsystems of FIG. 1, or any other combination of subsystems and modules. For example, the method of FIG. 3 may be executed as shown by an imaging subsystem 300 on the left side, and a milling subsystem 310 on the right side. The steps listed in this method need not be executed in the particular order shown. Imaging subsystem 300 may comprise hardware and software for generating an image of an assay or a plurality of assays. For example, imaging subsystem 300 may comprise a whole-slide scanner such as Ventana iScanHT or Ventana iScanCoreo and the whole-slide image review and management system such as VIRTUOSO® or SCANSCOPE® or any other digital pathology workstation. Imaging subsystem 300 may further comprise imaging components such as a camera mounted on a microscope or a whole-slide scanner having a microscope. Milling subsystem 310 may comprise hardware and software for meso-dissection of one or more tissue slides or milling slides into specific containers associated with the image project, or the patient under diagnosis. Milling subsystem 310 may further comprise imaging and milling components such as a camera mounted on a milling platform and hardware for capturing milled or dissected tissue into labeled containers, as further described herein.

Imaging subsystem 300 may generate and scan (S301) a plurality of images corresponding to serial sections of a tissue block of any biological specimen, for example, a biopsy taken from a patient thought to be suffering from cancer. One or more images may be designated as a reference image that is presented on an interface enabling a user to designate areas or objects of interest, and label and annotate (S302) these areas of interest for milling, or for other diagnostic and processing purposes. A milling image may further be designated for subsequent milling. For instance, the milling image may represent an unstained tissue section. Annotations (S302) of portions of the reference or milling images may depict clinically relevant regions such as immune or tumor regions where the particular biomarker expression is high. The annotations can be either the complete or sub-regions of tumor or any other biologically meaningful non-tumor components, such as a lymphatic region, stromal region, heterogeneous regions, IHC marker sub-type regions, etc. Annotations may also be automatically generated using image analysis operations for detecting and/or segmenting objects or areas of interest within the reference image(s). For example, automated image analysis operations may detect desired tissue types such as tumors, lymphatic regions in H&E slide, etc., or hot spots of high marker expression in IHC stained slides like any tumor, immune or vessel markers tumor markers, immune markers, etc. The reference image may depict an H&E slide.

Registration (S303) of these annotations to images of adjacent tissue slides may include mapping of annotations from said annotated reference image to one or more milling images. Registration (S303) may use an inter-marker operation for registration operations across assays with different combinations of stains and markers, such as methods further described with reference to commonly-assigned and co-pending EP patent application WO2014140070A2, the contents of which are hereby incorporated herein by reference in their entirety. A same-marker registration operation may be used for transferring annotations across images representing similarly-stained slides. The images associated with the patient, including any annotated images, reference images, and milling images, as well as any additional metadata including annotations in XML or other formats, and assay information, may be exported (S304) to a project database. For example, project database 106 enables imaging subsystem 100 to export one or more projects or image collections along with annotations to other external systems, such as milling subsystem 110. Project database 106 may comprise an image management system (IMS).

As described herein, high-resolution images of milling slides and high-resolution milling annotations may be imported into existing meso-dissection or milling systems such as milling subsystem 310, thereby improving the ability to use the milling annotations for a live-image of a milling slide intended to be dissected by milling subsystem 310. At any time during the image acquisition of imaging subsystem 300, milling subsystem 310 may be loaded (S311) with a milling slide with a live-image being captured (S312) of the milling slide. If the milling slide is intended to be imaged by imaging subsystem 300, then loading (S311) of the milling slide necessarily occurs after scanning (S301) of the milling slide. Alternatively, loading (S311) of milling slide may occur at any time that the image project is created (S304). In either case, any combinations of annotated milling or reference images or just the annotations from the project may be imported (S313). The live image of the milling slide may be captured at a user-specified zoom level. The annotations may be imported as a .XML file, or any combination of an XML and image file, or any other format described herein, enabling the annotations to be translated to a format that enables mapping the annotations to the image of the milling slide. The annotations may be registered (S314) to the live-capture of the milling slide using an inter-marker or same-marker registration to enable more precise dissections. Assuming that the reference image is the same as the milling image or that the milling image depicts an unstained slide that is the same as the live-image, a same-marker registration (S314) may be used.

Importing annotations of milling images eliminates the need to load a reference slide or import reference images into milling subsystem 310. By providing real-time communication between imaging subsystem 300 and milling subsystem 310, and by providing registration mechanisms in both subsystems, it may be possible for an operator of a digital pathology workstation of imaging subsystem 300 to interact with a live-capture component of milling subsystem 300. Moreover, universal importation of annotations from differently-stained slides stored in the project database enables dissection of not only unstained tissue slides, but also stained tissue slides, once the coverslip is removed. Additionally, the ability to import multiple annotations enables mapping of annotations from multiple reference images to a single or multiple milling slides for tissue dissection. In addition to mapping annotations from reference images to milling slide images, milling subsystem 310 may provide an interface to fine-tune or adjust the annotations prior to milling. High-resolution milling annotations imported from imaging subsystem 300 may be mapped to the live image at a resolution appropriate for imaging and milling components and depending on the zoom level of the live image.

Finally, dissection (S315) may be performed on the milling slides by following the annotations mapped from reference or milling images to the live image of the milling slide. This includes determining the necessary metrics for milling, including determining an optimal milling path on the milling slide based on the annotations, as well as determining a required diameter of the pipette and optimal volume of liquid to be dispensed for the tissue intended for dissection. Tissue that is milled based on the annotations is subsequently extracted for analysis into a container that is labelled in association with the project, or patient under diagnosis. The analysis can be any type of analysis, such as molecular and/or genetic sequence analysis. Results of the analysis may also be tracked using a similar labelling mechanism that links the reference/milling images in the project, the specific annotations used to generate the milled tissue, and the container, with a patient's record.

Figure 4:
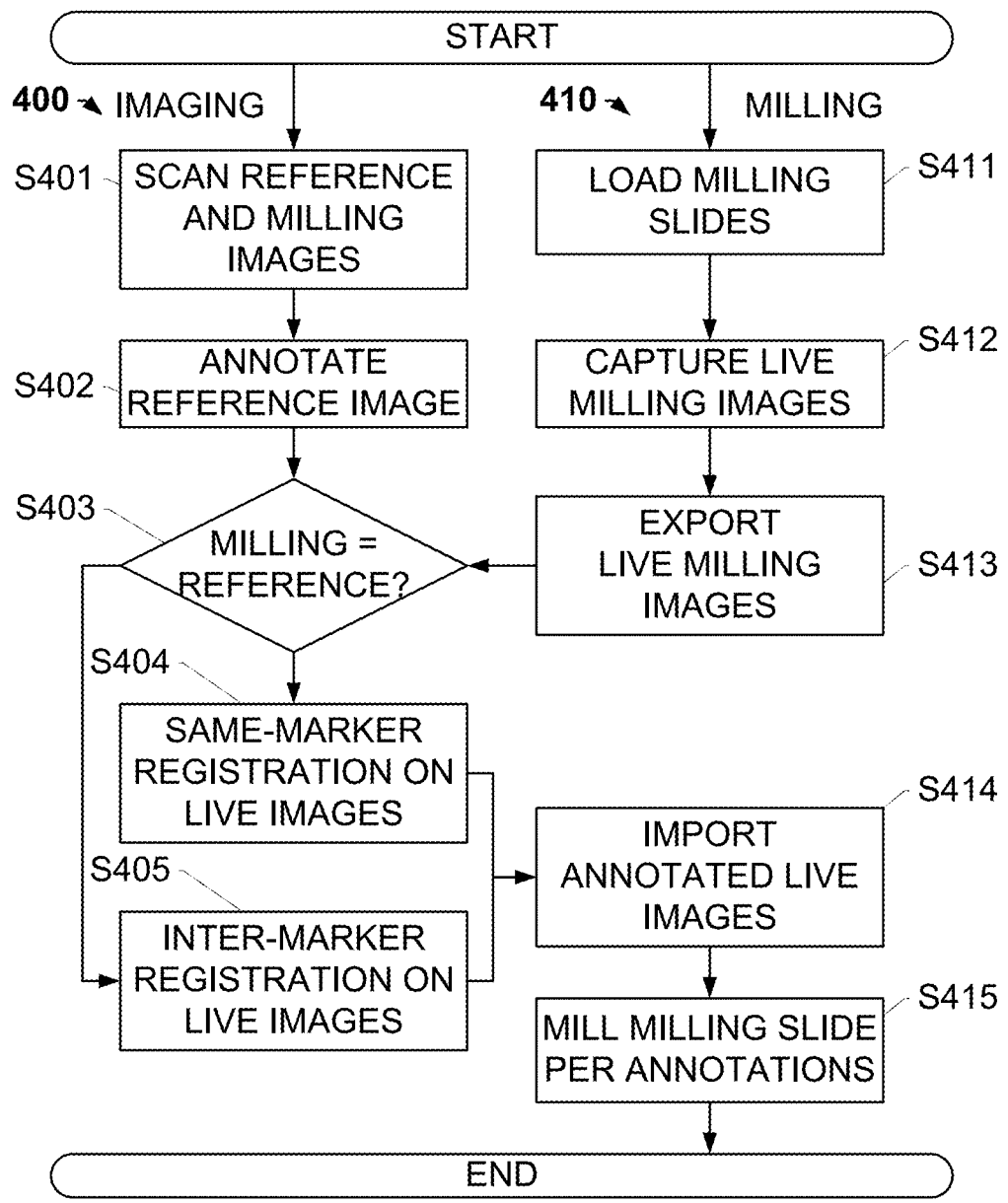
FIG. 4 depicts such an alternate method for meso-dissection using separate imaging and milling subsystems, according to an exemplary embodiment of the subject disclosure.

As described herein, it may be possible for a remote operator on an imaging system such as a digital pathology workstation to control milling operations on a remote milling subsystem that is external to the imaging subsystem. FIG. 4 depicts such an alternate method for meso-dissection using separate imaging and milling subsystems, according to an exemplary embodiment of the subject disclosure. The method of FIG. 4 is similar to the method of FIG. 3, in that it may be executed by any combination of the modules depicted in the subsystems of FIG. 1, or any other combination of subsystems and modules. For example, the method of FIG. 3 may be executed as shown by an imaging subsystem 400 on the left side, and a milling subsystem 410 on the right side. Imaging subsystem 400 may comprise hardware and software for generating an image of an assay or a plurality of assays. For example, imaging subsystem 400 may comprise a whole-slide image management system such as VIRTUOSO® or SCANSCOPE® or any other digital pathology workstation. Imaging subsystem 400 may further comprise imaging components such as a camera mounted on a microscope or a whole-slide scanner having a microscope. Milling subsystem 410 may comprise hardware and software for meso-dissection of one or more tissue slides or milling slides into specific containers associated with the image project, or the patient under diagnosis. Milling subsystem 410 may further comprise imaging and milling components such as a camera mounted on a milling platform and hardware for capturing milled or dissected tissue into labeled containers, as further described herein. However, the operations performed by each subsystem are different than that of FIG. 3.

For example, imaging subsystem 400 may generate and scan (S401) a plurality of images corresponding to serial sections of a tissue block, such as a biopsy taken from a patient thought to be suffering from cancer. One or more images may be designated as a reference image that is presented on an interface enabling a user to designate areas or objects of interest, and label and annotate (S402) these areas of interest for milling, or for other diagnostic and processing purposes. A milling image may further be designated for subsequent milling. For instance, the milling image may represent an unstained tissue section.

Concurrently or at any time subsequent to the image acquisition, milling subsystem 410 may be loaded (S411) with a milling slide and a live-image captured (S412) of the milling slide. The live image of the milling slide may be captured at a user-specified zoom level. The live image may be exported (S413) to imaging system for registration operations. The registration operations performed may depend on a determination (S403) of whether or not the milling image is the same as the annotated reference image. If the milling image is the same as the annotated reference image, then a same-marker registration (S404) may be used to map annotations. For example, the milling image may depict an unstained slide that is the same as the slide captured (S412) in the live-image. Alternatively, if the live milling image is different than the reference image, i.e., if it uses a different stain combination, then inter-marker registration (S405) may be used to map the annotations from the annotated reference image to one or more milling images.

The method of FIG. 4 therefore eliminates any need for manual or automated registration on a milling system. Registration operations are performed solely on the digital pathology workstation/imaging system 400, and a final annotated live milling image is imported (S414) by milling subsystem 410 to perform dissection. This further enables mapping annotations from multiple differently-stained slides to a milling image prior to submitting the annotated milling image to milling subsystem 410. In addition to importing annotations from imaging subsystem 400, milling subsystem 410 may provide an interface to fine-tune or adjust the annotations prior to milling. Finally, dissection (S415) may be performed on the milling slides by following the imported annotations. Tissue that is milled based on the annotations is subsequently extracted for analysis into a container that is labelled in association with the project, or patient under diagnosis.

Figure 5:
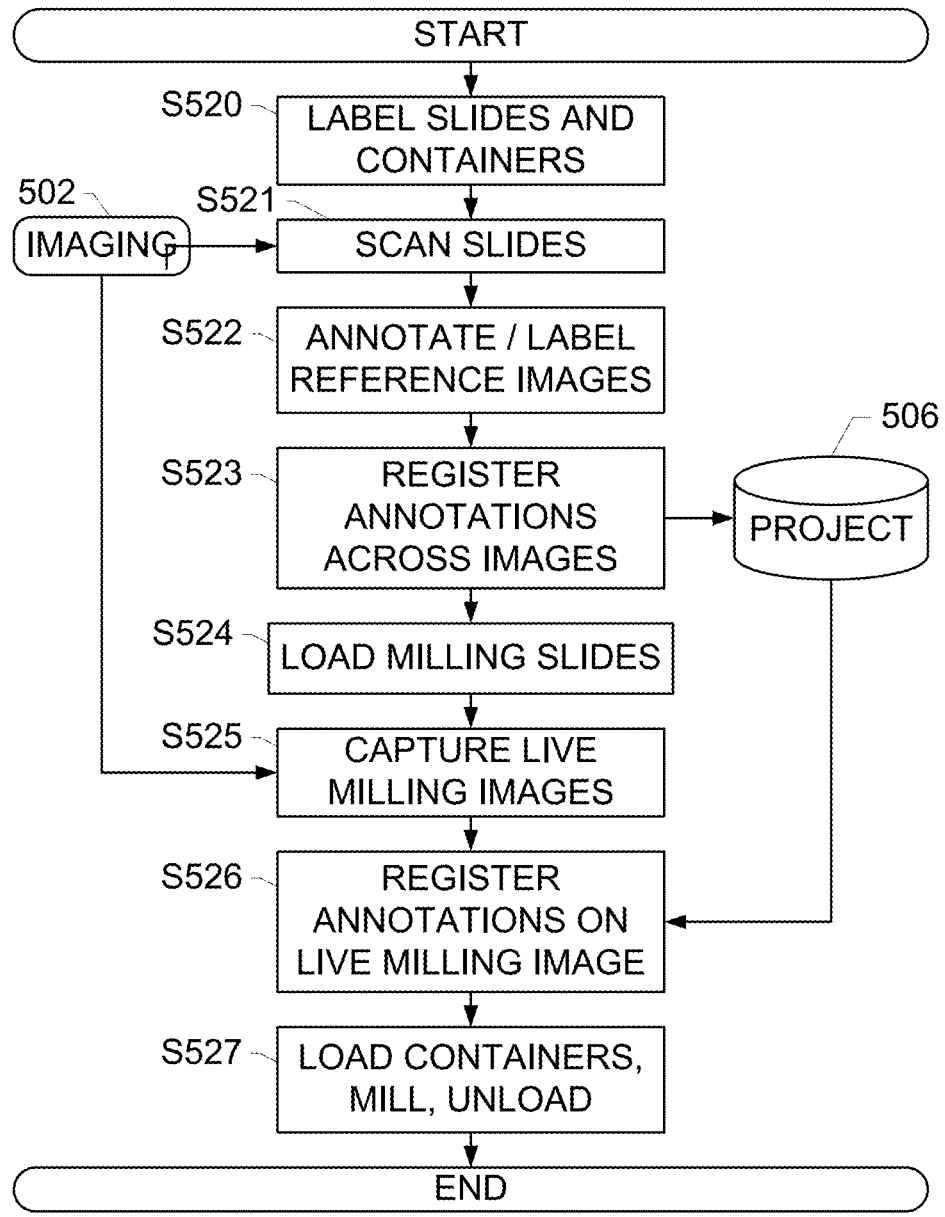
FIG. 5 depicts a method for meso-dissection using combined imaging and milling subsystems, according to an exemplary embodiment of the subject disclosure.

FIG. 5 depicts a method for meso-dissection using combined imaging and milling subsystems, according to an exemplary embodiment of the subject disclosure. The method of FIG. may be executed by any combination of the modules depicted in the system of FIG. 2, or any other combination of subsystems and modules. For example, the operations of FIG. 5 may be performed by a system that includes hardware and software for generating an image of an assay or a plurality of assays and for performing meso-dissection, with both imaging and milling components being controlled and operated through a common software application stored on, for instance, a memory that stores a plurality of processing modules or logical instructions that are executed by a processor coupled to a computer. Moreover, the steps listed in this method need not be executed in the particular order shown.

As described with reference to FIG. 5, a plurality of slides from serial sections of tissue associated with a patient, and containers for receiving milled tissue, may be labeled (S520) with an identifier unique to a record of the patient under diagnosis, enabling tracking of the milled tissue along with association of the milled tissue with the particular annotation and reference slides. This ensures that each imported reference image and annotation is properly associated with specific milling operations and resulting milled tissue, all of which may be associated with an electronic patient record. Each serial section is mounted on an individual slide and stained with a different combination of stains and biomarkers, resulting in a plurality of assays depicting adjacent tissue sections. Further, imaging components 502 may be used to scan the slides (S521) to generate images corresponding to each slide. Imaging components 502 may include a camera mounted on a microscope or a whole-slide scanner having a microscope, as well as a camera for generating a live image of a milling slide (S525). Imaging components 502 for scanning and for milling may be independent or shared between scanning and milling components. The images may be scanned (S521) at any zoom level specified by a pathologist, and may depict any type of biological feature, such as H&E or any other IHC, ISH, cytology (urinal, blood smear thin prep, air dried, touch prep, cell block) CTC, and/or hematology slide of interest.

Annotation and labeling (S522) of the generated images enables a user or automated image analysis operation to designate areas or objects of interest, and label and annotate these areas of interest for milling, or for other diagnostic and processing purposes. The annotations may be registered (S523) to transfer annotations from an annotated image to one or more adjacent images, including a milling image. Any combination of an inter-marker or same-marker registration may be used. For example, registration operations across assays with different combinations of stains and markers use an inter-marker operation, such as methods further described with reference to commonly-assigned and co-pending EP patent application WO2014140070A2, the contents of which are hereby incorporated herein by reference in their entirety. Registration operations across assays with the same stain combination may be performed by same-marker registration operations, such as those described with reference to commonly-assigned and co-pending U.S. patent application 61/885,024, the contents of which are hereby incorporated herein by reference in their entirety. Any other registration method may be used so long as it provides automated mapping of annotations across images having different stains, in a manner that enables precise milling of areas of interest based on annotated reference slides or enables registration of stained and unstained slides. The images associated with the patient, including any annotated images, reference images, and milling images, as well as any additional metadata including annotations in XML, or other formats, and assay information, may be stored in a project database 506. For example, the images and associated data/metadata may be exported into an image management system (IMS).

The annotations from any one or more images in project database 406 may be automatically mapped to a live-image, depending on a biological question or intended diagnosis. For instance, a slide designated as a milling slide and labeled in association with the patient or project may be mounted (S524) on a milling stage or platform, such as an x-y table, and a live milling image may be generated (S525) using imaging components 502 or other imaging components that include a camera mounted on the milling platform or stage. The live image may be captured at a user-specified zoom level that is the same or different than the zoom level at which the reference/milling images were originally captured. Annotations from any slide from project database 506 may be registered (S526) to the live-image of the milling slide using an inter-marker or same-marker registration to enable more precise dissections. For example, a same-marker registration may be used to register annotations from an annotated milling image to a live-image.

Dissection is performed (S527) on the milling slides by following the milling annotations mapped to the live image. This includes either manual procedures or automated robotic tools and instrumentation control and command software for loading the appropriately-labeled containers, determining the necessary metrics for milling, including determining an optimal milling path on the milling slide based on the annotations, as well as determining a required diameter of the pipette and optimal volume of liquid to be dispensed for the tissue intended for dissection, and extracting the tissue that is milled based on the annotations into the labeled containers.

As described herein, annotations from a plurality of reference images may be imported, enabling multiple areas of interest to be dissected from a milling slide. For example, the annotations for milling can be generated from a permutation or combination of annotations specified on the individual reference slides. The milling annotations may be user-specified and problem specific—i.e., generated to answer a particular biological question (like tumor heterogeneity, IHC4, etc.). For example, if co-expression analysis is important, the individual marker annotations are specified on each of the marker reference slides. In this case, the milling annotations, to indicate the specific regions for co-expression analysis, are a logical intersection of these annotations from multiple individual slide annotations. Similarly, if the biological interest is an inclusion of all the annotated regions from all markers, the milling annotations are a logical union of all the individual reference slide(s) annotations. For example, for a breast cancer patient, a typical series of IHC slides includes an H&E slide, an ER marked slide, a KR and PR marked slide, a Ki-67 marked slide, and an HER2-marked slide, each one having separate annotations for the expression of their respective markers. In the H&E slide, for instance, tumor and lymphatic regions may be annotated. A pathologist or biologist may be interested in a region that is ER positive and PR negative, or where all the markers are PR positive and Ki-67 negative, or any logical combination of regions for analysis. Multiple combinations of these constraints may be specified in order to automatically generate milling annotations. In another example, given an H&E slide associated with a tissue block, an adjacent serial section of a BRAFV600E-stained IHC slide, and an adjacent serial section PTEN-stained IHC slide, and a biological question to identify regional areas where there is expression of BRAFV600E and no expression of PTEN, the method can respectively identify the BRAFV600E-expressing regions (from the BRAFV600E slide) and PTEN non-expressing regions (from the PTEN slide), and identify regions where these areas overlap on the H&E slide. A resultant milling annotation would include these overlapping areas to be meso-dissected on the H&E slide. Any combinations of tumor markers or a combination of expressions (such as positive/negative) may be specified to further understand the tumor environment of the tissue specimen. Thus, as dictated by the underlying biological problem, several logical permutations and combinations of annotations can be used to construct the set of milling annotations. The milling annotations are the ones that get used by a milling system to drill and extract the tissue from each of the milling slides into the specified tissue containers as further described herein. Moreover, the high-resolution annotations used to generate the milling annotations ensure that a higher-quality milling operation is performed with minimal corruption of raw data (milled tissue) for analysis.

As described herein, slides, images thereof, and extracted tissue samples/containers may be labeled with an identifier unique to a record of the patient under diagnosis, enabling tracking of the milled tissue along with association of the milled tissue with the particular milling annotation and set of reference slides. This may be enabled by, for instance, bar-coding (or using an equivalent unique labeling system) every component of the above-described workflows and recording them in an image management system (IMS) or electronic patient record (EPR). Therefore, a single record maintains all analytic and process information that is enhanced using the accurate annotation registering and milling operations described herein. This ensures that each imported annotation or set of annotations is properly associated with specific milling operations and resulting milled tissue, all of which may be associated with an electronic patient record.

Figure 6:
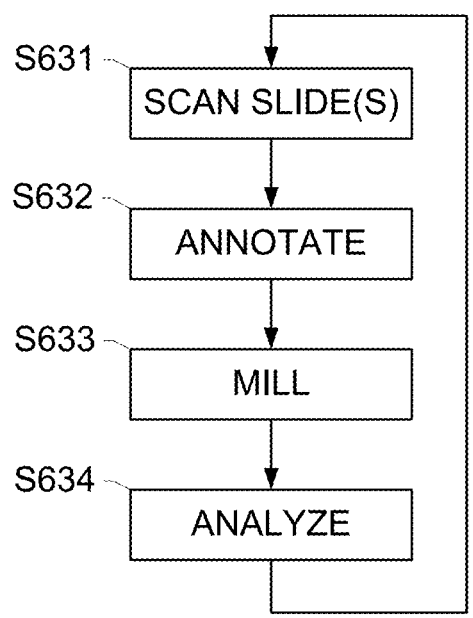
FIG. 6 depicts a loop-back analysis enabled by the systems and methods disclosed herein, according to an exemplary embodiment of the subject disclosure.

Moreover, this enables enhanced analysis of tissue specimens by looping back the results of an analysis with further analysis of additional tissue samples dissected from the same or different slides within the collection of slides. FIG. 6 depicts a loop-back analysis enabled by the systems and methods disclosed herein, according to an exemplary embodiment of the subject disclosure. Tissue may be scanned (S631), annotated and registered (S632), milled (S633) and analyzed (S634) as described herein and, based on the analysis performed on the milled tissue, subsequent steps of a workflow may be determined such as deciding to annotate and mill additional regions from either the same or a different milled slide for additional, the same, or different types of molecular/genetic analysis, or a decision to stain and create additional sets of test slides and use them for annotations and milling. The analysis can be performed only on the milled tissue or may include a combination of any analysis or scoring operations performed on reference or other stained slides in addition to the analysis performed on the milled slide.

Analysis information from H&E/IHC/ISH reference slides may be combined with the molecular expression/ genetic sequence information obtained from the extracted tissue in the unstained slides in several ways. For example, for different tissue types dissected from a tissue slide, once the tumor tissue is extracted, several different types of molecular and genetic sequence analysis results may be obtained, including qRT-PCR, PCR, NGS, DNA-seq, mRNA-seq, MeDIP-seq, MRE-seq, methyl-specific PCR, etc. Combinations of analysis performed independently on a reference slide and analysis performed on extracted tissue regions from milled slides may be used to answer a particular biological hypothesis by correlating against a clinical outcome. Combined analysis may include use of the image features extracted from the reference slides along with the features computed from the extracted tissue to answer a particular biological question and correlating against the clinical outcome. For a specific biological hypothesis such as a prognosis of early-stage breast cancer patients (using IHC4 analysis), an analysis operation may integrate features computed from the analysis results from the reference slide (H&E/IHC/ISH) tissue image analysis and the molecular/ genetic feature data/analysis information by correlating the composite information against the associated clinical outcome data. An example of this is potentially using the composite information from such a workflow to prognosticate early-stage breast cancer patients in the context of IHC4.

Moreover, the application of the disclosed embodiments may be for pre-clinical, clinical and or research use. The disclosed operations may be used for clinical diagnostic for prognostic or predictive purposes, for research purpose drug development, drug discovery in the pharmaceutical industry, and may be useful as a companion agnostic/algorithmic workflow for patient stratification as drug responders and non-responders. Moreover, besides medical applications such as anatomical or clinical pathology, breast/prostrate/ lung/colorectal/gastric cancer diagnosis, etc., and the same methods may be performed to analysis other types of samples such as remote sensing of geologic or astronomical data, etc. The operations disclosed herein may be ported into a hardware graphics processing unit (GPU), enabling a multi-threaded parallel implementation.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, a touch screen and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text-based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32- or 64-bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random-access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

ADDITIONAL EMBODIMENTS

An instrument for combined digital pathology and meso-dissection, comprising: a processor; and a memory coupled to the processor, the memory to store computer-readable instructions that, when executed by the processor, cause the processor to perform operations comprising: using an intermarker registration operation to map annotations from a first image to one or more of a plurality of adjacent images including a milling image; and subsequently dissecting a milling slide corresponding to the milling image based on the annotations; wherein the annotations are mapped to a live-image of the milling slide. The instrument of embodiment 1, wherein the first image and the plurality of adjacent images correspond to serial sections of a tissue block.

The instrument of any one of the preceding embodiments, wherein annotated areas of interest on the milling slide are subsequently dissected based on the annotated live image.

The instrument of any one of the preceding embodiments, wherein the first image and the milling image correspond to the same milling slide.

The instrument of any one of the preceding embodiments, wherein the operations further comprise generating a milling annotation based on the annotations.

The instrument of any one of the preceding embodiments, wherein the one or more annotations comprise XML data.

The instrument of any one of the preceding embodiments, wherein the operations further comprise associating the one or more annotations and a milled tissue sample from the milling slide with a patient.

The instrument of embodiment 7, wherein the associating comprises using a unique identifier.

The instrument of embodiment 7 or 8, wherein a result of analysis of the milled tissue sample is also associated with the patient.

The instrument of any one of the preceding embodiments, wherein a result of analysis of the milled tissue sample is used to determine one or more of a subsequent scanning operation or a subsequent milling operation.

A digital pathology instrument, comprising: a processor; and a memory coupled to the processor, the memory to store computer-readable instructions that, when executed by the processor, cause the processor to perform operations comprising annotating a first image of a plurality of serial images of a tissue block; mapping one or more annotations from the first image to a milling image; and exporting the one or more annotations of the milling image to a milling system.

The instrument of embodiment 11, wherein the milling system dissects a milling slide associated with the milling image based on the one or more annotations and/or wherein the milling system maps the annotations from the annotated milling image to a live image of a milling slide using a same-marker registration operation.

The instrument of embodiment 11 or 12, wherein the mapping of annotations from the first image to the milling image uses an intermarker registration operation.

A meso-dissection instrument, comprising: a processor; and a memory coupled to the processor, the memory to store computer-readable instructions that, when executed by the processor, cause the processor to perform operations comprising: importing one or more annotations from an imaging system, wherein the one or more milling annotations indicate regions of interest of a tissue specimen, said tissue specimen being one of a plurality of serial sections of a tissue block, and wherein said one or more milling annotations were generated on a workstation coupled to a scanner for scanning said tissue specimen; mapping the one or more annotations to a live image of a milling slide to generate milling annotations; and dissecting the milling slide based on the milling annotations.

The instrument of embodiment 14, wherein the mapping of annotations to the live image is based on a same-marker registration operation.

The instrument of embodiment 14 or 15, wherein the annotations are translated to a coordinate system of the live image.

A computer-implemented method for combined digital pathology and meso-dissection comprising the steps: mapping annotations from a first image to one or more of a plurality of adjacent images including a milling image; and subsequently dissecting a milling slide corresponding to the milling image based on the annotations; wherein the annotations are mapped to a live-image of the milling slide.

The method of embodiment 17, wherein the mapping of annotations from the first image to the milling image uses an intermarker registration operation and/or wherein the milling system maps the annotations from the annotated milling image to a live image of a milling slide using a same-marker registration operation.

The method of embodiment 17 or 18, wherein the first image and the plurality of adjacent images correspond to serial sections of a tissue block.

The method of any one of embodiments 17 to 19, wherein the one or more milling annotations indicate regions of interest of a tissue specimen, said tissue specimen being one of a plurality of serial sections of a tissue block, and wherein said one or more milling annotations are generated on a workstation coupled to a scanner for scanning said tissue specimen.

An instrument for combined digital pathology and meso-dissection, comprising: a processor; and a memory coupled to the processor, the memory to store computer-readable instructions that, when executed by the processor, cause the processor to perform the method of any one of embodiments 17 to 20.

A digital pathology instrument, equipped for being used in the method of any one of embodiments 17 to 20, comprising: a processor; and a memory coupled to the processor, the memory to store computer-readable instructions that, when executed by the processor, cause the processor to perform operations comprising: mapping annotations from a first image to one or more of a plurality of adjacent images including a milling image; and exporting the one or more annotations of the milling image to a milling system.

A meso-dissection instrument, equipped for being used in the method of any one of embodiments 17 to 20, comprising: a processor; and a memory coupled to the processor, the memory to store computer-readable instructions that, when executed by the processor, cause the processor to perform operations comprising: importing one or more annotations from an imaging system, and dissecting a milling slide corresponding to the milling image based on the annotations; wherein the annotations are mapped to a live-image of the milling slide.

We claim:

1. A system for dissecting a milling specimen disposed on a milling slide comprising, the system comprising: (a) an imaging apparatus, and (ii) a milling instrument, wherein the milling instrument includes (i) one or more processors, and (ii) one or more memories coupled to the one or more processors, the one or more memories to store computer-executable instructions that, when executed by the one or more processors, cause the system to perform operations comprising: (a) automatically mapping one or more annotations from a first image acquired by the imaging apparatus to one or more adjacent images, wherein the one or more adjacent images includes at least a milling image of a tissue specimen disposed on a milling slide; and (b) dissecting one or more portions of tissue from the tissue specimen disposed on the milling slide based on the one or more annotations; wherein the milling image is a live-image of the milling slide.

2. The system of claim 1, wherein the first image and the one or more adjacent images correspond to different serial sections of a tissue block.

3. The system of claim 1, wherein the one or more annotations indicate regions of interest of a tissue specimen, said tissue specimen being one of a plurality of different serial sections derived from a tissue block, and wherein said one or more milling annotations are generated on a workstation coupled to a scanner for scanning said tissue specimen.

4. The system of claim 3, wherein each different serial section is disposed on a different substrate.

5. The system of claim 1, where the annotations are automatically mapped using a same-marker registration operation.

6. The system of claim 1, wherein the annotations are automatically mapped using an inter-marker registration operation.

7. The system of claim 1, wherein the operations further comprise generating a milling annotation.

8. A system for dissecting a milling specimen disposed on a milling slide comprising, the system comprising: (a) a whole slide scanner, and (ii) a milling instrument, wherein the milling instrument includes (i) one or more processors, and (ii) one or more memories coupled to the one or more processors, the one or more memories to store computer-executable instructions that, when executed by the one or more processors, cause the system to perform operations comprising: automatically mapping one or more first annotations from a first image of a first specimen acquired by the whole slide scanner to a milling image corresponding to the milling specimen disposed on the milling slide, wherein the first specimen and the milling specimen comprise different serial sections derived from a single tissue block; and dissecting the milling specimen disposed on the milling slide based on the one or more first annotations automatically mapped to the milling image.

9. The method of claim 8, wherein the milling image comprises a live image.

10. The system of claim 8, wherein the milling image is a stored image.

11. The system of claim 8, further comprising automatically mapping the one or more first annotations from the first image to a second image of a second specimen, wherein the second specimen is derived from the single tissue block and differs from the serial sections corresponding to the first specimen and milling specimen.

12. The system of claim 8, wherein the automatically mapping of the one or more first annotations is performed using an inter-marker registration algorithm.

13. A digital pathology instrument, comprising: a processor; and a memory coupled to the processor, the memory to store computer-readable instructions that, when executed by the processor, cause the processor to perform operations comprising annotating a first image of a plurality of serial images of a tissue block; mapping the annotations from the first image to a milling image; and exporting the one or more annotations of the milling image to a milling system.

14. The instrument of claim 13, wherein the milling system dissects a milling slide associated with the milling image based on the annotations and/or wherein the milling system maps the annotations from the annotated milling image to a live image of a milling slide using a same-marker registration operation.

15. The instrument of claim 14, wherein the mapping of the annotations from the first image to the milling image uses an inter-marker registration operation.

16. The instrument of claim 14, wherein the mapping of the annotations from the first image to the milling image uses same-marker registration operation.

* * * * *